(12) United States Patent
Tomlins et al.

(10) Patent No.: US 7,513,108 B2
(45) Date of Patent: Apr. 7, 2009

(54) REGENERATION STRATEGY

(75) Inventors: Gregory Wayne Tomlins, Peoria, IL (US); Steven James Funke, Mapelton, IL (US); Chandini Muniratnam Ammineni, Peoria, IL (US); Michael Paul Withrow, Peoria, IL (US); Anil Raina, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 130 days.

(21) Appl. No.: 11/239,138

(22) Filed: Sep. 30, 2005

(65) Prior Publication Data

US 2007/0074508 A1 Apr. 5, 2007

(51) Int. Cl.
*F01N 3/00* (2006.01)

(52) U.S. Cl. ............................. 60/295; 60/274; 60/286; 60/297; 60/311

(58) Field of Classification Search ................. 60/274, 60/286, 295, 297, 303, 311
See application file for complete search history.

(56) References Cited

U.S. PATENT DOCUMENTS

| | | | |
|---|---|---|---|
| 4,567,725 A * | 2/1986 | Shinzawa et al. ............. 60/274 |
| 4,651,524 A | 3/1987 | Brighton | |
| 5,458,673 A | 10/1995 | Kojima et al. | |
| 5,980,414 A | 11/1999 | Larkin | |
| 6,325,834 B1 | 12/2001 | Fonseca et al. | |
| 6,829,890 B2 * | 12/2004 | Gui et al. ....................... 60/295 |
| 6,878,283 B2 | 4/2005 | Thompson | |
| 7,013,638 B2 * | 3/2006 | Hiranuma et al. ............. 60/286 |
| 2004/0226352 A1 | 11/2004 | Craig et al. | |
| 2004/0237513 A1 | 12/2004 | Bunting et al. | |

FOREIGN PATENT DOCUMENTS

| | | |
|---|---|---|
| EP | 1 479 900 A1 | 11/2004 |
| GB | 2397539 A1 | 7/2004 |
| JP | 05202733 A2 | 8/1993 |
| JP | 05 231128 A | 9/1993 |
| JP | 2002115528 A2 | 4/2002 |
| JP | 2002-180816 * | 6/2002 |
| JP | 2003083036 A2 | 3/2003 |
| JP | 2004190568 A2 | 7/2004 |
| RU | 2198303 C2 | 2/2003 |

OTHER PUBLICATIONS

PCT International Search Report; PCT/US2006/031661; International Filing Date: Aug. 14, 2006; Applicant: Caterpillar Inc.

* cited by examiner

*Primary Examiner*—Thomas E Denion
*Assistant Examiner*—Diem Tran
(74) *Attorney, Agent, or Firm*—Finnegan, Henderson, Farabow, Garrett & Dunner

(57) ABSTRACT

A method for altering an operating condition of a filter includes actively increasing the temperature of the filter to a desired temperature below a regeneration temperature and sensing a filter operating condition at about the desired temperature. The method also includes comparing the sensed filter operating condition to an expected filter operating condition range and actively increasing the temperature of the filter to the regeneration temperature in response to the comparison.

19 Claims, 2 Drawing Sheets

REGENERATION STRATEGY

TECHNICAL FIELD

The present disclosure relates generally to a particulate filter and, more particularly, to a strategy for regenerating a filter.

BACKGROUND

Engines, including diesel engines, gasoline engines, natural gas engines, and other engines known in the art, may exhaust a complex mixture of air pollutants. The air pollutants may be composed of both gaseous and solid material, such as, for example, particulate matter. Particulate matter may include ash and unburned carbon particles called soot.

Due to increased environmental concerns, some engine manufacturers have developed systems to treat engine exhaust after it leaves the engine. Some of these systems employ exhaust treatment devices, such as particulate traps, to remove particulate matter from the exhaust flow. A particulate trap may include filter material designed to capture particulate matter. After an extended period of use, however, the filter material may become partially saturated with particulate matter, thereby hindering the particulate trap's ability to capture particulates.

The collected particulate matter may be removed from the filter material through a process called regeneration. A particulate trap may be regenerated by increasing the temperature of the filter material and the trapped particulate matter above the combustion temperature of the particulate matter, thereby burning away the collected particulate matter. This increase in temperature may be effectuated by various means. For example, some systems may employ a heating element to directly heat one or more portions of the particulate trap (e.g., the filter material or the external housing). Other systems have been configured to heat exhaust gases upstream of the particulate trap. The heated gases then flow through the particulate trap and transfer heat to the filter material and captured particulate matter. Such systems may alter one or more engine operating parameters, such as the ratio of air to fuel in the combustion chambers, to produce exhaust gases with an elevated temperature. Alternatively, such systems may heat the exhaust gases upstream of the particulate trap with, for example, a burner disposed within an exhaust conduit leading to the particulate trap.

One such system is disclosed by U.S. Pat. No. 4,651,524, issued to Brighton on Mar. 24, 1987 ("the '524 patent"). The '524 patent discloses an exhaust treatment system configured to increase the temperature of exhaust gases with a burner.

While the system of the '524 patent may increase the temperature of the particulate trap, the regeneration device of the '524 patent is not configured to assess whether an exothermic event may occur within the filter prior to actively initiating a regeneration event. As a result, such systems may cause the filter to overheat during regeneration, thereby damaging the filter.

The disclosed regeneration assembly is directed toward overcoming one or more of the problems set forth above.

SUMMARY OF THE INVENTION

In an exemplary embodiment of the present disclosure, a method for altering an operating condition of a filter includes actively increasing the temperature of the filter to a desired temperature below a regeneration temperature and sensing a filter operating condition at about the desired temperature. The method also includes comparing the sensed filter operating condition to an expected filter operating condition range and actively increasing the temperature of the filter to the regeneration temperature in response to the comparison.

In another exemplary embodiment of the present disclosure, a method of preventing damage to a filter during regeneration includes actively increasing the temperature of the filter to a desired temperature below a regeneration temperature and sensing a filter operating condition at about the desired temperature. The method also includes comparing the sensed filter operating condition to an expected filter operating condition range and maintaining the filter at the desired temperature for a desired period of time. The method further includes actively increasing the temperature of the filter to the regeneration temperature in response to the comparison.

In yet another exemplary embodiment of the present disclosure, an exhaust treatment system of a power source includes a filter having a housing with an inlet, a regeneration device fluidly connected to the inlet of the housing, and at least one sensor configured to sense an operating characteristic of the filter. The exhaust treatment system also includes a controller in communication with the regeneration device and the at least one sensor. The controller is configured to controllably increase the temperature of the filter to a desired temperature below a regeneration temperature. The controller is also configured to compare a sensed filter operating condition to an expected filter operating condition range at about the desired temperature, and actively increase the temperature of the filter to the regeneration temperature in response to the comparison.

DETAILED DESCRIPTION

Figure 1:
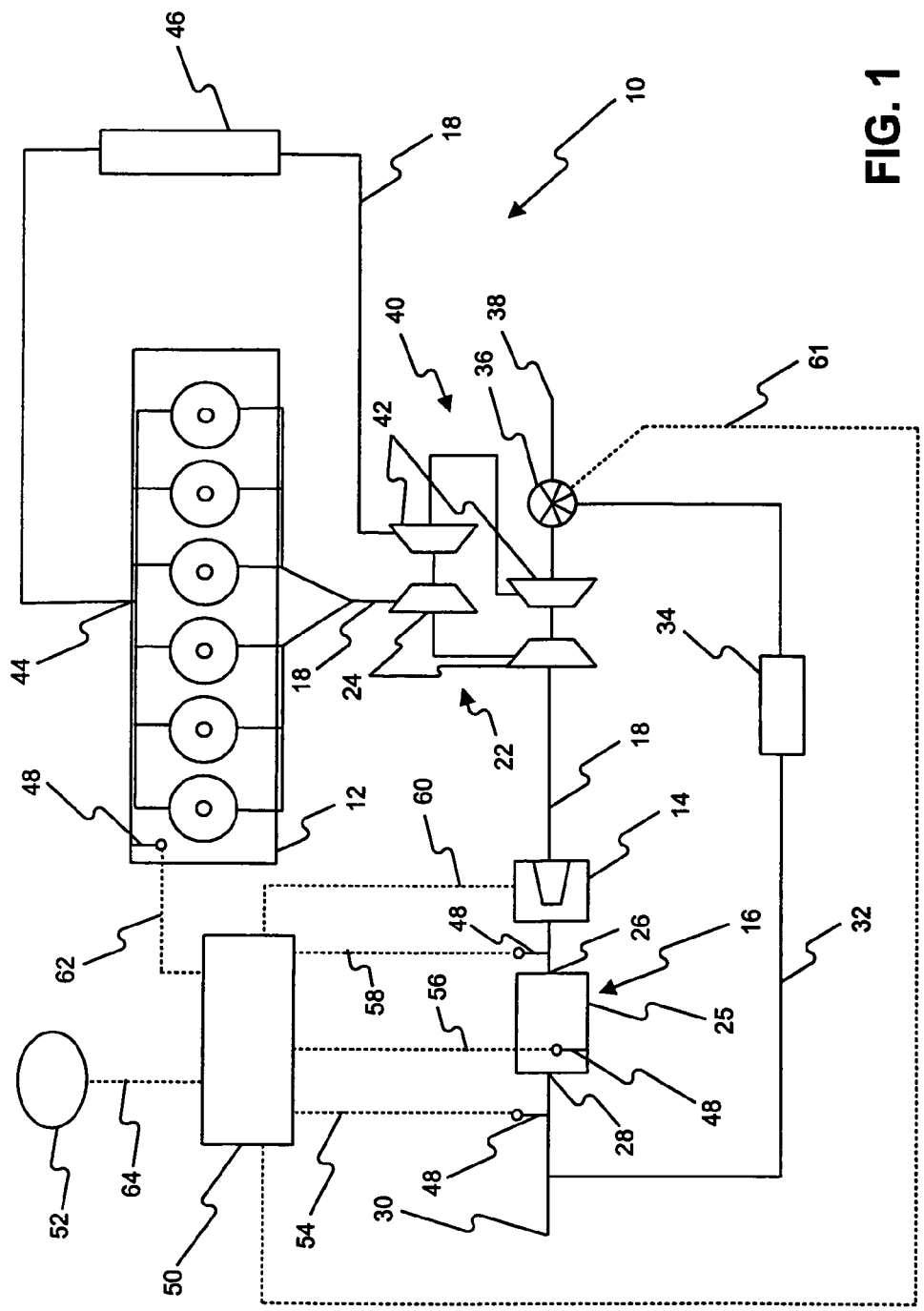
FIG. 1 is a diagrammatic illustration of an engine having an. exhaust treatment system according to an exemplary embodiment.

FIG. 1 illustrates an exhaust treatment system 10 connected to a power source 12. The power source 12 may include an engine, such as, for example, a diesel engine, a gasoline engine, a natural gas engine, or any other. engine apparent to one skilled in the art. The power source 12 may, alternately, include another source of power, such as a furnace or any other source of power known in the art.

The exhaust treatment system 10 may be configured to direct exhaust gases out of the power source 12, treat the gases, and introduce a portion of the treated gases into an intake 44 of the power source 12. The exhaust treatment system 10 may include an energy extraction assembly 22, a regeneration device 14, a filter 16, a recirculation line 32 fluidly connected downstream of the filter 16, and a flow cooler 34. The exhaust treatment system 10 may further include a mixing valve 36, a compression assembly 40, and an aftercooler 46.

A flow of exhaust produced by the power source 12 may be directed from the power source 12 to components of the exhaust treatment system 10 by flow lines 18. The flow lines 18 may include pipes, tubing, and/or other exhaust flow carrying means known in the art. The flow lines 18 may be made of alloys of steel, aluminum, and/or other materials known in the art. The flow lines 18 may be rigid or flexible, and may be capable of safely carrying high temperature exhaust flows, such as flows having temperatures in excess of 700 degrees Celsius (approximately 1,292 degrees Fahrenheit).

The energy extraction assembly 22 may be configured to extract energy from, and reduce the pressure of, the exhaust gases produced by the power source 12. The energy extraction assembly 22 may be fluidly connected to the power source 12 by one or more flow lines 18 and may reduce the pressure of the exhaust gases to any desired pressure. The energy extraction assembly 22 may include one or more turbines 24, diffusers, or other energy extraction devices known in the art. In an exemplary embodiment wherein the energy extraction assembly 22 includes more than one turbine 24, the multiple turbines 24 may be disposed in parallel or in series relationship. It is also understood that in an embodiment of the present disclosure, the energy extraction assembly 22 may, alternately, be omitted. In such an embodiment, the power source 12 may include, for example, a naturally aspirated engine. As will be described in greater detail below, a component of the energy extraction assembly 22 may be configured in certain embodiments to drive a component of the compression assembly 40.

In an exemplary embodiment, the regeneration device 14 may be fluidly connected to the energy extraction assembly 22 via a flow line 18, and may be configured to increase the temperature of an entire flow of exhaust produced by the power source 12 to a desired temperature. The desired temperature may be, for example, a regeneration temperature of the filter 16. Alternatively, the desired temperature may be a temperature less than a regeneration temperature of the filter 16. Accordingly, the regeneration device 14 may be configured to assist in regenerating the filter 16. The regeneration device 14 may be in communication with a controller 50, as illustrated by control line 60.

The regeneration device 14 may include, for example, a fuel injector and an ignitor (not shown), heat coils (not shown), and/or other heat sources known in the art. Such heat sources may be disposed within the regeneration device 14, and may be configured to assist in increasing the temperature of the flow of exhaust through convection, combustion, and/or other methods. In an exemplary embodiment in which the regeneration device 14 includes a fuel injector and an ignitor, it is understood that the regeneration device 14 may receive a supply of a combustible substance and a supply of oxygen to facilitate combustion within the regeneration device 14. The combustible substance may be, for example, gasoline, diesel fuel, reformate, and/or any other combustible substance known in the art. The supply of oxygen may be provided in addition to the relatively low pressure flow of exhaust gas directed to the regeneration device 14 through flow line 18. In an exemplary embodiment, the supply of oxygen may be carried by a flow of gas directed to the regeneration device 14 from downstream of the compression assembly 40. In such an embodiment, the flow of gas may include, for example, recirculated exhaust gas and ambient air.

As shown in FIG. 1, the filter 16 may be connected downstream of the regeneration device 14. The filter 16 may have a housing 25 including an inlet 26 and an outlet 28. The filter 16 may be any type of filter known in the art capable of extracting matter from a flow of gas. In an embodiment of the present disclosure, the filter 16 may be, for example, a particulate matter filter positioned to extract particulates from an exhaust flow of the power source 12. The filter 16 may include, for example, a ceramic substrate, a metallic mesh, foam, or any other porous material known in the art. These materials may form, for example, a honeycomb structure within the housing 25 of the filter 16 to facilitate the removal of particulates. The particulates may be, for example, soot.

In an exemplary embodiment of the present disclosure, a filter 16 of the exhaust treatment system 10 may include catalyst materials useful in collecting, absorbing, adsorbing, and/or storing hydrocarbons, oxides of sulfur, and/or oxides of nitrogen contained in a flow. Such catalyst materials may include, for example, aluminum, platinum, palladium, rhodium, barium, cerium, and/or alkali metals, alkaline-earth metals, rare-earth metals, or combinations thereof The catalyst materials may be situated within the filter 16 so as to maximize the surface area available for absorption, adsorption, and/or storage. The catalyst materials may be located on a substrate of the filter 16. The catalyst materials may be added to the filter 16 by any conventional means, such as, for example, coating or spraying, and the substrate of the filter 16 may be partially or completely coated with the materials. It is understood that the catalyst materials described above may be capable of oxidizing hydrocarbons in certain conditions.

The recirculation line 32, fluidly connected downstream of the filter 16 and upstream of an exhaust system outlet 30, may be configured to assist in directing a portion of the exhaust flow from the filter 16 to the inlet 44 of the power source 12. The recirculation line 32 may comprise piping, tubing, and/or other exhaust flow carrying means known in the art, and may be structurally similar to the flow lines 18 described above.

The flow cooler 34 may be fluidly connected to the filter 16 via the recirculation line 32, and may be configured to cool the portion of the exhaust flow passing through the recirculation line 32. The flow cooler 34 may include a liquid-to-air heat exchanger, an air-to-air heat exchanger, or any other type of heat exchanger known in the art for cooling an exhaust flow. In an alternative exemplary embodiment of the present disclosure, the flow cooler 34 may be omitted.

The mixing valve 36 may be fluidly connected to the flow cooler 34 via the recirculation line 32 and may be configured to assist in regulating the flow of exhaust through the recirculation line 32. It is understood that in an exemplary embodiment, a check valve (not shown) may be fluidly connected upstream of the flow cooler 34 to further assist in regulating the flow of exhaust through the recirculation line 32. The mixing valve 36 may be a spool valve, a shutter valve, a butterfly valve, a check valve, a diaphragm valve, a gate valve, a shuttle valve, a ball valve, a globe valve, or any other valve known in the art. The mixing valve 36 may be actuated manually, electrically, hydraulically, pneumatically, or in any other manner known in the art. The mixing valve 36 may be in communication with the controller 50 via control line 61, and may be selectively actuated in response to one or more predetermined conditions.

The mixing valve 36 may also be fluidly connected to an ambient air intake 38 of the exhaust treatment system 10. Thus, the mixing valve 36 may be configured to control the amount of exhaust flow entering the compression assembly 40 relative to the amount of ambient air flow entering the compression assembly 40. For example, as the amount of exhaust flow passing through the mixing valve 36 is desirably increased, the amount of ambient air flow passing through the mixing valve 36 may be proportionally decreased and vice versa.

The compression assembly 40 may include a compressor 42 configured to increase the pressure of a flow of gas to a desired pressure. The compressor 42 may include a fixed geometry type compressor, a variable geometry type compressor, or any other type of compressor known in the art. In the exemplary embodiment shown in FIG. 1, the compression assembly 40 may include more than one compressor 42, and the multiple compressors 42 may be disposed in parallel or in series relationship. A compressor 42 of the compression assembly 40 may be connected to a turbine 24 of the energy extraction assembly 22, and the turbine 24 may be configured to drive the compressor 42. In particular, as hot exhaust gases exit the power source 12 and expand against the blades (not shown) of the turbine 24, components of the turbine 24 may rotate and drive the connected compressor 42.

The aftercooler 46 may be fluidly connected to the power source 12, and may be configured to cool a flow of gas passing to the intake 44. In an exemplary embodiment, this flow of gas may be the ambient air/exhaust flow mixture discussed above. The aftercooler 46 may include a liquid-to-air heat exchanger, an air-to-air heat exchanger, or any other type of flow cooler or heat exchanger known in the art. In an exemplary embodiment of the present disclosure, the aftercooler 46 may be omitted if desired.

The exhaust treatment system 10 may also include a plurality of sensors 48 configured to collect data corresponding to various operating characteristics of a device. The sensors 48 may measure, for example, pressure, flow, temperature, particulate content, and/or other operating characteristics known in the art. In an exemplary embodiment of the present disclosure, at least one sensor 48 may be connected to the power source 12 and may be configured to measure temperature, speed, fuel quantity consumed, and/or other power source 12 operating characteristics. In another exemplary embodiment, a sensor 48 may be disposed proximate the inlet 26 of the filter 16, and another sensor 48 may be disposed proximate the outlet 28. Such sensors 48 may be configured to measure temperature, pressure, and/or other filter operating characteristics. It is understood that such sensors 48 may assist in measuring, for example, a pressure drop and/or a change in temperature across the filter 16, and that such measurements may correspond to sensed exhaust flow characteristics. The exhaust treatment system 10 may further include a sensor 48 disposed within the filter 16 configured to measure any of the filter operating characteristics mentioned above. The sensor 48 disposed within the filter 16 may also be configured to measure the quantity of soot contained within the filter 16. As illustrated by data lines 54, 56, 58, and 62 shown in FIG. 1, the sensors 48 described above may be in communication with the controller 50, and may be configured to send data thereto. It is understood that the sensor locations, types, and functions described herein are merely exemplary, and that the sensors 48 may have locations, may be of types, and may have functions other than those listed above.

The controller 50 may be, for example, an electronic control module, a system computer, a central processing unit, or other data storage and manipulation device known in the art. The controller 50 may be configured to send and receive data. The controller 50 may also store data received from the sensors 48 and from various operator interfaces 52. The controller 50 may be configured to manipulate stored and/or received data using stored algorithms, stored exhaust treatment system component limits, and/or preset maps. In an exemplary embodiment, the controller 50 may be configured to control a regeneration event based on sensed operating characteristics, expected filter operating characteristics, and/or filter design limits.

Operator interfaces 52 may be located in an operator compartment of a work machine to which the exhaust treatment system 10 is connected, but can be located elsewhere. Such operator interfaces 52 may include, but are not limited to, levers, switches, buttons, foot petals, joysticks, control wheels, touchpads, LCD displays, computer screens, and keyboards. The operator interfaces 52 may be in communication with the controller 50 via a communication line 64, and may be useful in notifying the operator of, for example, an operating characteristic of the filter 16, the regeneration device 14, and/or the power source 12.

INDUSTRIAL APPLICABILITY

The exhaust treatment system 10 of the present disclosure may be used with any combustion-type device, such as, for example, an engine, a furnace, or any other device known in the art where the recirculation of reduced-particulate exhaust into an inlet of the device is desired. The exhaust treatment system 10 may be useful in reducing the amount of harmful exhaust emissions discharged into the environment. The exhaust treatment system 10 may also be capable of purging the portions of the exhaust gas captured by components of the system through a regeneration process. The exhaust treatment system 10 may further be configured to assess the condition of the filter 16 before actively beginning regeneration. Such an assessment may reduce the potential for damage to the filter 16 caused by uncontrolled regeneration. As used herein, the term "active regeneration" refers to using a regeneration device or some other heat source to initiate the burning and/or combustion of, for example, soot contained within a filter. Alternatively, "passive regeneration" refers to burning and/or combusting, for example, soot contained within a filter without supplying additional heat to a flow of exhaust gas with regeneration devices or other heat sources.

The power source 12 may combust a mixture of fuel, recirculated exhaust gas, and ambient air to produce mechanical work and an exhaust flow containing a mixture of pollutants. These pollutants may exist in solid, liquid, and/or gaseous form. In general, the solid and liquid pollutants may fall into the three categories of soot, soluble organic fraction, and sulfates. The soot produced during combustion may include carbonaceous materials, and the soluble organic fraction may include unburned hydrocarbons that are deposited on, or otherwise chemically combined with, the soot. The exhaust flow may be directed from the power source 12 through the energy extraction assembly 22. The hot exhaust flow may expand on the blades of the turbines 24 of the energy extraction assembly 22, and this expansion may reduce the pressure of the exhaust flow while assisting in rotating the turbine blades.

The reduced pressure exhaust flow may pass through the regeneration device 14 to the filter 16. The regeneration device 14 may be deactivated during the normal operation of the power source 12. As the exhaust flow passes through the filter 16, a portion of the particulate matter entrained with the exhaust flow may be captured by the substrate, mesh, and/or other structures within the filter 16.

A portion of the filtered exhaust flow may be extracted downstream of the filter 16. The extracted portion of the exhaust flow may enter the recirculation line 32, and may be recirculated back to the power source 12. Catalyst materials contained within the filter 16 may assist in oxidizing the hydrocarbons and soluble organic fraction carried by the flow. After passing through the filter 16, the filtered exhaust flow may exit the exhaust treatment system 10 through the exhaust system outlet 30.

The recirculated portion of the exhaust flow may pass through the flow cooler 34. The flow cooler 34 may reduce the temperature of the portion of the exhaust flow, and the mixing valve 36 may be configured to regulate the ratio of recirculated exhaust flow to ambient inlet air passing to the compression assembly 40. The compressors 42 may increase the pressure of the flow, thereby increasing the temperature of the flow. The compressed flow may pass through the flow line 18 to the aftercooler 46, which may reduce the temperature of the flow before the flow enters the intake 44 of the power source 12.

Figure 2:
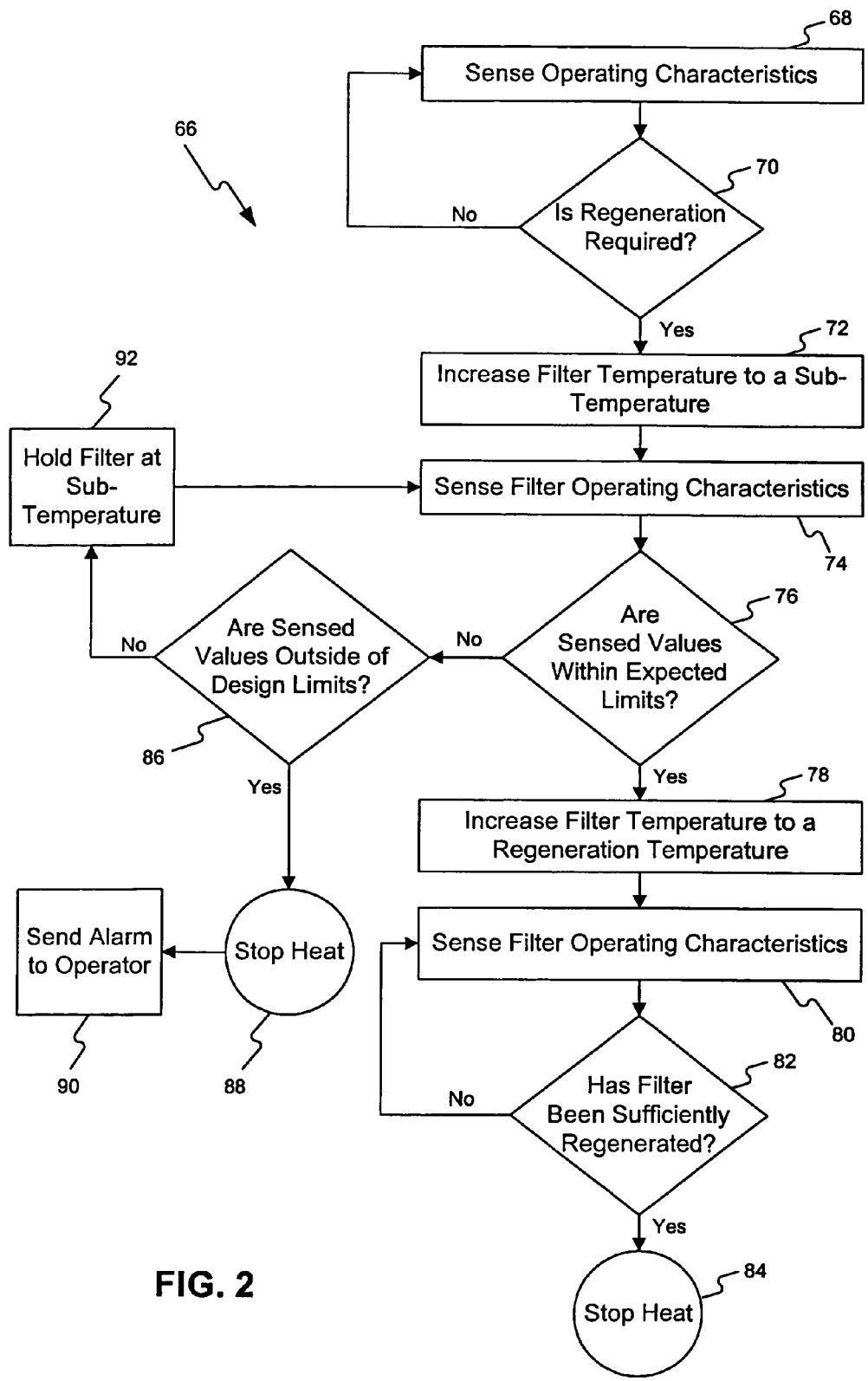
FIG. 2 is a flowchart of a filter regeneration method according to an exemplary embodiment.

Over time, soot produced by the combustion process may collect in the filter 16, and may begin to impair the ability of the filter 16 to store particulates. The controller 50 may determine that it is necessary to regenerate the filter 16 once the filter's storage abilities are reduced to unsatisfactory levels. As shown by the control strategy 66 illustrated in FIG. 2, the sensors 48 may sense operating characteristics of the power source 12, the filter 16, and/or the exhaust treatment system 10, generally (Step 68), and may send data representing these sensed characteristics to the controller 50. Reference will be made to FIG. 2 for the duration of this disclosure. It is understood, however, that any discussion of the components of the exhaust treatment system 10 will be made with reference to FIG. 1.

The controller 50 may use the information sent from the sensors 48 in conjunction with an algorithm or other preset criteria, such as, for example, maps and/or soot loading models, to determine whether the filter 16 has become saturated and is in need of regeneration (Step 70). In an exemplary embodiment, trigger values corresponding to one or more of the sensed operating characteristics may be saved in a memory of the controller 50. Such trigger values may include, for example, a maximum pressure drop across the filter 16, a maximum increase in temperature across the filter 16, a maximum engine temperature, a maximum quantity of fuel consumed, and a maximum soot load in the filter 16. The soot loading of the filter 16 may be calculated or estimated by the controller 50. Alternatively, the soot loading may be measured using one or more sensors 48 disposed within the filter 16. It is understood that a maximum elapsed run time may also be used as a trigger value. If none of the above trigger values has been met (Step 70: No), the controller 50 may not initiate the regeneration process and the sensors 48 may continue to sense operating characteristics. Once one of the above trigger values has been reached, the controller 50 may send appropriate signals to components of the exhaust treatment system 10 to begin the regeneration process (Step 70: Yes).

The controller 50 may send a control signal to ignite, or otherwise activate, the regeneration device 14. It is understood that the regeneration device 14 may controllably increase the temperature of an exhaust flow, thereby increasing the temperature of the filter 16 through convection. Activating the regeneration device 14 may, for example, increase the temperature of the filter media to a desired sub-temperature (Step 72). The sub-temperature may be a desired temperature less than a regeneration temperature of the filter 16. In an exemplary embodiment, the sub-temperature may be in the range of approximately 300° Celsius to approximately 500° Celsius. As will be described in greater detail below, actively increasing the temperature of the filter 16 to a sub-temperature within this exemplary range may enable the controller 50 to evaluate the conditions of the filter 16 before increasing its temperature to the regeneration temperature and potentially damaging the filter 16.

It is understood that increasing the temperature of the exhaust flow may also be accomplished by using other structures and methods. For example, in an embodiment of the present disclosure (not shown), the timing of the opening of the exhaust valves in the power source combustion chambers may be modified to increase exhaust flow temperature. In particular, the exhaust valves may be controlled to open several degrees before the commencement of an exhaust stroke of the power source 12. In another exemplary embodiment (not shown), a fuel injection cycle of the power source 12 may be modified to increase the exhaust flow temperature. In an additional exemplary embodiment, the position of the mixing valve 36 may be manipulated to increase the temperature of the exhaust flow entering the filter 16.

After increasing the filter temperature to the sub-temperature, the sensors 48 may continue to sense operating characteristics of the filter 16 at the sub-temperature (Step 74) and may send this data to the controller 50. Based on this data, the controller 50 may determine whether the sensed values are within an expected range (Step 76) for the respective operating characteristics. For example, upon increasing the temperature of the exhaust flow entering the filter 16 to a sub-temperature of approximately 400° Celsius, the controller 50 may expect a measured outlet flow temperature between approximately 400° Celsius and approximately 405° Celsius when filter conditions are normal. It is understood that in exemplary normal filter conditions, substantially no oil or fuel may be present within the filter 16 and the amount of accumulated soot may be substantially below the design limits of the filter 16.

If the sensed filter operating characteristics are within their respective expected ranges (Step 76: Yes), the controller 50 may command the regeneration device 14 to increase the flow temperature, and thus, the filter temperature, to a regeneration temperature (Step 78). In an exemplary embodiment of the present disclosure, the regeneration temperature may be in the range of approximately 600° Celsius to approximately 650° Celsius. The regeneration device 14 may hold the flow temperature at the regeneration temperature while the filter 16 regenerates and the soot and other particulate matter trapped therein is burned away.

It is understood that in an exemplary embodiment of the present disclosure, the temperature of the filter 16 may be increased according to a desired filter temperature profile. In such an embodiment, the regeneration device 14 may increase the temperature of the exhaust flow in a stepwise manner. For example, the regeneration device 14 may raise the exhaust flow temperature from a sub-temperature of approximately 400° Celsius to a regeneration temperature of approximately 650° Celsius in increments of approximately 50° Celsius. The controller 50 may command the regeneration device 14 to maintain an increased temperature for a desired period of time in accordance with the desired filter temperature profile. Such a profile may, for example, assist in minimizing damage to the filter 16 caused by repeated regenerations over the life of the filter 16.

The sensors 48 may continue to sense filter operating characteristics at the regeneration temperature (Step 80), and the controller 50 may determine whether the filter 16 has been sufficiently regenerated (Step 82) based on this sensed data. It is understood that the controller 50 may use, for example, pressure drop, temperature increase, regeneration elapsed time, quantity of fuel consumed, and/or other sensed operating characteristics in conjunction with stored algorithms and/or preset maps, such as soot loading models, to make this determination.

If the filter 16 has been sufficiently regenerated (Step 82: Yes), the controller 50 will command the regeneration device 14 to deactivate (Step 84). If the filter 16 has not been sufficiently regenerated (Step 82: No), the regeneration device 14 will continue to maintain the regeneration temperature, and the sensors 48 and the controller 50 will continue to evaluate the operating conditions of the filter 16 until it has been sufficiently regenerated.

Alternatively, if any of the operating characteristics measured at the sub-temperature are determined not to be within their respective expected ranges (Step 76: No), the controller 50 may determine whether the sensed values are outside of the known design limits of the filter 16 (Step 86). For example, heating the exhaust flow to a sub-temperature of 400° Celsius may cause the temperature of the flow measured proximate the outlet 28 of the filter 16 to exceed the design limits of the filter 16 due to abnormal conditions within the filter 16. It is understood that in exemplary abnormal filter conditions, oil and/or fuel may be present within the filter 16. In addition, the amount of accumulated soot may be substantially above the design limits of the filter 16. Such abnormal filter conditions may cause an uncontrolled regeneration to occur at the sub-temperature, thereby causing irreparable harm to the filter, such as, for example, cracking or melting. Evaluating filter operating conditions at sub-temperatures, however, may assist in mitigating and/or avoiding such harm. If the sensed values are outside of design limits, (Step 86: Yes), the controller 50 may deactivate the regeneration device 14 (Step 88) and may send an alarm to and/or otherwise notify the operator (Step 90). Such an alarm may indicate that the filter 16 is damaged and requires replacing.

If the sensed operating characteristic values are outside of their respective expected limits, but are not outside of the design limits of the filter 16 (Step 86: No), the controller 50 may command the regeneration device 14 to hold the filter 16 at the sub-temperature for a desired period of time (Step 92). Doing so may, for example, cause any oil and/or fuel accumulated within the filter 16 to burn away without causing harm to the filter 16. The filter 16 may eventually return to normal conditions as determined by the continued sensing of filter operating characteristics at the sub-temperature (Step 74).

Other embodiments of the disclosed exhaust treatment system 10 will be apparent to those skilled in the art from consideration of the specification. For example, the exhaust treatment system 10 may include additional filters such as, for example, a sulfur trap disposed upstream of the filter 16. The sulfur trap may be useful in capturing sulfur molecules carried by the exhaust flow. It is intended that the specification and examples be considered as exemplary only, with the true scope of the invention being indicated by the following claims.

What is claimed is:

1. A method for altering an operating condition of a filter, comprising:
    actively increasing the temperature of the filter to a desired temperature below a regeneration temperature;
    sensing a filter operating condition at about the desired temperature;
    comparing the sensed filter operating condition to an expected filter operating condition range;
    actively increasing the temperature of the filter to the regeneration temperature in response to the comparison;
    comparing the sensed filter operating condition to a design limit range of the filter; and
    maintaining the filter at the desired temperature for a predetermined period of time.

2. The method of claim 1, wherein the desired temperature is in the range of approximately 300° Celsius to approximately 500° Celsius.

3. The method of claim 1, wherein the sensed filter operating condition is one of pressure drop, change in temperature across the filter, and soot quantity.

4. The method of claim 1, wherein actively increasing the temperature of the filter to one of the desired temperature and the regeneration temperature includes at least one of modifying exhaust valve opening timing, activating a regeneration device, modifying a fuel injection cycle, and regulating a mixing valve position.

5. The method of claim 1, wherein the regeneration temperature is in the range of approximately 600° Celsius to approximately 650° Celsius.

6. The method of claim 1, wherein actively increasing the temperature of the filter to the regeneration temperature includes increasing the temperature according to a desired filter temperature profile.

7. The method of claim 1, wherein the temperature of the filter is actively increased from the desired temperature to the regeneration temperature in response to the comparison.

8. The method of claim 1, wherein actively increasing the temperature of the filter to one of the desired temperature and the regeneration temperature includes activating a fuel injector and an ignitor.

9. The method of claim 1, further including determining whether the filter has been sufficiently regenerated.

10. The method of claim 9, further including sensing a filter operating condition at about the regeneration temperature, wherein the determining of whether the filter has been sufficiently regenerated is based on the sensed filter operating condition at about the regeneration temperature.

11. A method of preventing damage to a filter during regeneration, comprising:
    actively increasing the temperature of the filter to a desired temperature below a regeneration temperature;
    sensing a filter operating condition at about the desired temperature;
    comparing the sensed filter operating condition to an expected filter operating condition range;
    maintaining the filter at the desired temperature for a desired period of time; and
    actively increasing the temperature of the filter to the regeneration temperature in response to the comparison.

12. The method of claim 11, wherein the desired temperature is in the range of approximately 300° Celsius to approximately 500° Celsius.

13. The method of claim 11, wherein the sensed filter operating condition is one of pressure drop, change in temperature across the filter, and soot quantity.

14. The method of claim 11, wherein actively increasing the temperature of the filter to one of the desired temperature and the regeneration temperature includes at least one of modifying exhaust valve opening timing, activating a regeneration device, modifying a fuel injection cycle, and regulating a mixing valve position.

15. The method of claim 11, wherein the regeneration temperature is in the range of approximately 600° Celsius to approximately 650° Celsius.

16. The method of claim 11, wherein actively increasing the temperature of the filter to the regeneration temperature includes increasing the temperature according to a desired filter temperature profile.

17. The method of claim 11, wherein the temperature of the filter is actively increased from the desired temperature to the regeneration temperature in response to the comparison.

18. The method of claim 11, further including determining whether the filter has been sufficiently regenerated.

19. The method of claim 18, further including sensing a filter operating condition at about the regeneration temperature, wherein the determining of whether the filter has been sufficiently regenerated is based on the sensed filter operating condition at about the regeneration temperature.

* * * * *